(12) United States Patent
Koshikawa et al.

(10) Patent No.: US 11,888,532 B2
(45) Date of Patent: Jan. 30, 2024

(54) SIGNAL PROCESSING DEVICE, SIGNAL PROCESSING METHOD, RECEIVER, AND OPTICAL COMMUNICATION SYSTEM

(71) Applicant: Mitsubishi Electric Corporation, Tokyo (JP)

(72) Inventors: Shota Koshikawa, Tokyo (JP); Keisuke Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/984,983

(22) Filed: Nov. 10, 2022

(65) Prior Publication Data

US 2023/0072203 A1    Mar. 9, 2023

Related U.S. Application Data

(63) Continuation of application No. PCT/JP2020/029749, filed on Aug. 4, 2020.

(51) Int. Cl.
*H04B 10/67* (2013.01)
*H04B 10/50* (2013.01)
(Continued)

(52) U.S. Cl.
CPC .......... *H04B 10/672* (2013.01); *H04B 10/29* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS 6,545,799 B1 *   4/2003   McNamara ......... H04J 14/0221
                                                     359/337.13
2002/0109885 A1   8/2002   Aburakawa et al.
(Continued)

FOREIGN PATENT DOCUMENTS

JP    2001-333005 A    11/2001
JP    2002-246965 A     8/2002
(Continued)

OTHER PUBLICATIONS

International Search Report for PCT/JP2020/029749 (PCT/ISA/210) dated Oct. 27, 2020.
(Continued)

*Primary Examiner* — Darren E Wolf
(74) *Attorney, Agent, or Firm* — Birch, Stewart, Kolasch & Birch, LLP

(57) ABSTRACT

A signal processing device processes reception signals of optical signals received by a receiver when the optical signals transmitted from a transmitter are propagated to the receiver via a plurality of paths, and includes: a signal-to-noise ratio calculating unit that calculates signal-to-noise ratios of the optical signals that have been propagated through the respective paths, from propagation distances of the optical signals in the respective paths, intensities of the optical signals transmitted from the transmitter, and intensities of noise with respect to the optical signals transmitted from the transmitter; an amplitude adjusting unit that adjusts amplitudes of the reception signals of the optical signals that have been propagated through the respective paths, using the corresponding signal-to-noise ratios calculated by the signal-to-noise ratio calculating unit; and a signal combining unit that combines the reception signals whose amplitudes have been adjusted by the amplitude adjusting unit.

7 Claims, 5 Drawing Sheets

(51) Int. Cl.
*H04B 10/40* (2013.01)
*H04B 10/29* (2013.01)
*H04B 10/60* (2013.01)

(56) References Cited

U.S. PATENT DOCUMENTS

| | | | | |
|---|---|---|---|---|
| 2002/0181045 | A1* | 12/2002 | Uda | H04J 14/0221 |
| | | | | 359/337.13 |
| 2002/0196506 | A1* | 12/2002 | Graves | H04B 10/1125 |
| | | | | 398/126 |
| 2003/0133713 | A1* | 7/2003 | Ng | H04B 10/2942 |
| | | | | 398/37 |
| 2007/0166052 | A1* | 7/2007 | Uda | H04J 14/0221 |
| | | | | 398/177 |
| 2008/0029650 | A1 | 2/2008 | Kawaguchi | |
| 2011/0116805 | A1* | 5/2011 | Xia | H04B 10/1121 |
| | | | | 398/131 |
| 2012/0294605 | A1* | 11/2012 | Noda | H04Q 3/0062 |
| | | | | 398/11 |
| 2016/0323091 | A1* | 11/2016 | Inoue | H04B 10/6164 |
| 2016/0373188 | A1 | 12/2016 | Lambert | |
| 2018/0006712 | A1* | 1/2018 | Hreha | H04W 72/0453 |

FOREIGN PATENT DOCUMENTS

| | | |
|---|---|---|
| JP | 2005-323145 A | 11/2005 |
| JP | 2016-139977 A | 8/2016 |
| JP | 2017-38355 A | 2/2017 |
| WO | WO 2005/123507 A1 | 12/2005 |

OTHER PUBLICATIONS

Written Opinion of the International Searching Authority for PCT/JP2020/029749 (PCT/ISA/237) dated Oct. 27, 2020.

* cited by examiner

SIGNAL PROCESSING DEVICE, SIGNAL PROCESSING METHOD, RECEIVER, AND OPTICAL COMMUNICATION SYSTEM

CROSS REFERENCE TO RELATED APPLICATION

This application is a Continuation of PCT International Application No. PCT/JP2020/029749, filed on Aug. 4, 2020, all of which is hereby expressly incorporated by reference into the present application.

TECHNICAL FIELD

The present disclosure relates to a signal processing device, a signal processing method, and a receiver that combine a plurality of reception signals, and an optical communication system including the receiver.

BACKGROUND ART

Among optical communication systems that transmit and receive optical signals, there is an optical communication system in which a transmitter transmits optical signals to a receiver via a plurality of paths, and the receiver receives the optical signals that have been propagated through the respective paths and combines a plurality of reception signals of the optical signals (hereinafter, also referred to as "conventional optical communication system").

By the way, there is a method in which a pilot signal indicating a channel quality of a path is included in an optical signal to be transmitted to a receiver by a transmitter (see, for example, Patent Literature 1). The channel quality indicates a degree of deterioration or the like of an optical signal propagated through a path.

CITATION LIST

Patent Literature

Patent Literature 1: JP 2017-38355 A

SUMMARY OF INVENTION

Technical Problem

In the conventional optical communication system, when channel qualities of a plurality of paths are different from each other, there is a problem that the number of bit errors included in a combined signal of a plurality of reception signals may increase.

When the method disclosed in Patent Literature 1 is applied to the conventional optical communication system, there is a possibility that a receiver can recognize channel qualities of a plurality of paths and contribute to reduction of the number of bit errors. However, when the method disclosed in Patent Literature 1 is applied to the conventional optical communication system in a case where there is an upper limit to the amount of transmission data that can be included in an optical signal, the amount of transmission data that can be included in the optical signal decreases by the amount of the pilot signal included in the optical signal. By the decrease in the amount of transmission data, all pieces of transmission data to be transmitted cannot be included in the optical signal in some cases. When all pieces of transmission data to be transmitted cannot be included in the optical signal, the method cannot be applied to the conventional optical communication system in some cases.

The present disclosure has been made in order to solve the above problems, and an object of the present disclosure is to obtain a signal processing device and a signal processing method capable of suppressing an increase in the number of bit errors included in a combined signal of a plurality of reception signals without including a pilot signal in an optical signal.

Solution to Problem

A signal processing device according to the present disclosure is a device to process reception signals of optical signals received by a receiver when the optical signals transmitted from a transmitter are propagated to the receiver via a plurality of paths, and includes: signal-to-noise ratio calculating circuitry to calculate signal-to-noise ratios of the optical signals that have been propagated through the respective paths, from propagation distances of the optical signals in the respective paths, intensities of the optical signals transmitted from the transmitter, and intensities of noise with respect to the optical signals transmitted from the transmitter; amplitude adjusting circuitry to adjust amplitudes of the reception signals of the optical signals that have been propagated through the respective paths, using the corresponding signal-to-noise ratios calculated by the signal-to-noise ratio calculating circuitry; and signal combining circuitry to combine the reception signals whose amplitudes have been adjusted by the amplitude adjusting circuitry.

Advantageous Effects of Invention

According to the present disclosure, it is possible to suppress an increase in the number of bit errors included in a combined signal of a plurality of reception signals without including a pilot signal in an optical signal.

BRIEF DESCRIPTION OF DRAWINGS

FIG. 6 is a hardware configuration diagram of a computer when the signal processing device 35 is implemented by software, firmware, or the like.

DESCRIPTION OF EMBODIMENTS

Hereinafter, in order to describe the present disclosure in more detail, embodiments for carrying out the present disclosure will be described with reference to the attached drawings.

First Embodiment

Figure 1:
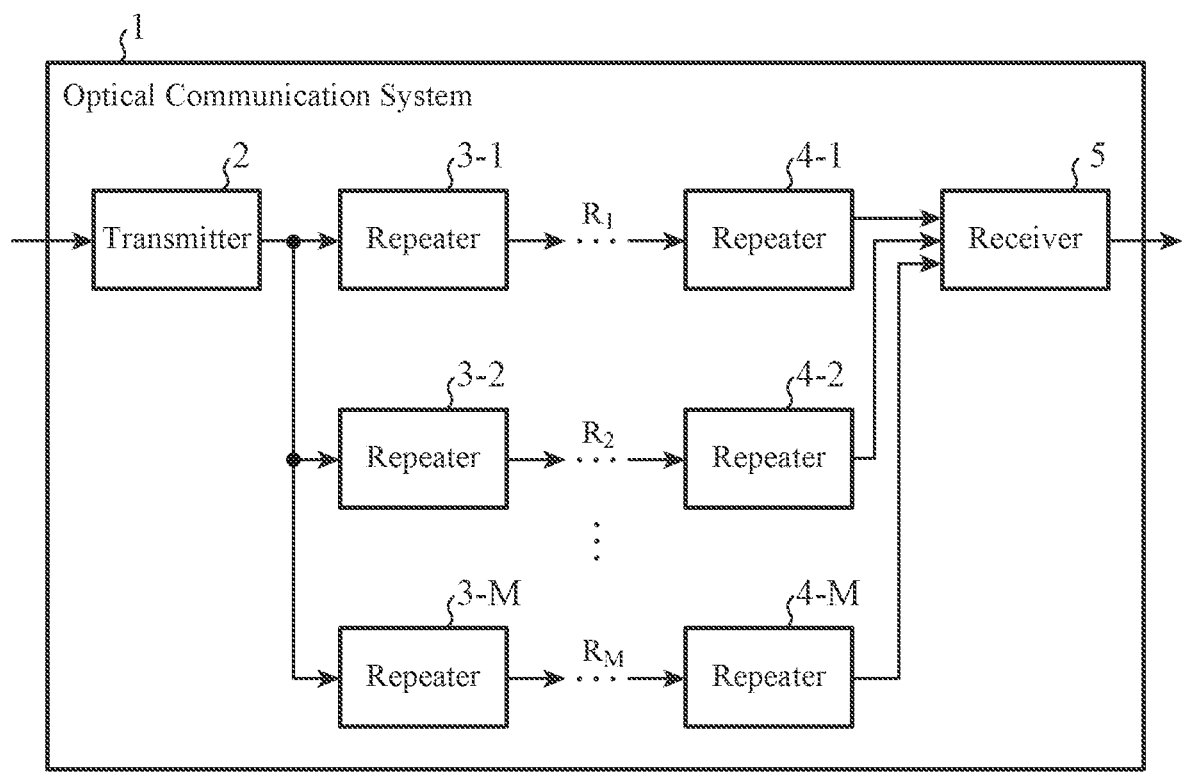
FIG. 1 is a configuration diagram illustrating an optical communication system 1 according to a first embodiment.

FIG. 1 is a configuration diagram illustrating an optical communication system 1 according to a first embodiment.

The optical communication system 1 illustrated in FIG. 1 is a system that transmits and receives an optical signal in outer space. However, this is merely an example, and the optical communication system 1 illustrated in FIG. 1 may be, for example, a system that transmits and receives an optical signal on the earth.

The optical communication system 1 includes a transmitter 2, M repeaters 3-1 to 3-M, M repeaters 4-1 to 4-M, and a receiver 5. M is an integer equal to or more than 2. Hereinafter, when the M repeaters 3-1 to 3-M are not distinguished from each other, they may be referred to as repeaters 3. In addition, when the M repeaters 4-1 to 4-M are not distinguished from each other, they may be referred to as repeaters 4.

There are a total of M paths through which optical signals are propagated from the transmitter 2 to the receiver 5, and the repeaters 3 and 4 are arranged on each of the M paths. Hereinafter, the M paths are referred to as paths $R_1$, $R_2$, ..., and $R_M$.

In the optical communication system 1 illustrated in FIG. 1, two or more repeaters 3 and 4 are arranged on each path $R_m$. However, this is merely an example, and only one repeater may be disposed on each path $R_m$. Alternatively, a repeater does not have to be disposed on each path $R_m$, and an optical signal may be directly transmitted from the transmitter 2 to the receiver 5.

Note that, in the optical communication system 1 illustrated in FIG. 1, M paths are intentionally formed as paths through which optical signals are propagated, and there is no unintended path other than the M paths.

The transmitter 2 transmits an optical signal to each of the repeaters 3-1 to 3-M.

A repeater 3-$m$ ($m=1, \ldots, M$) is disposed on a path $R_m$.

The repeater 3-$m$ transfers the optical signal transmitted from the transmitter 2 to a repeater 4-$m$.

The repeater 4-$m$ is disposed on the path $R_m$.

The repeater 4-$m$ transfers the optical signal transferred by the repeater 3-$m$ to the receiver 5.

The receiver 5 receives the optical signals transferred by the repeaters 4-1 to 4-M.

Figure 2:
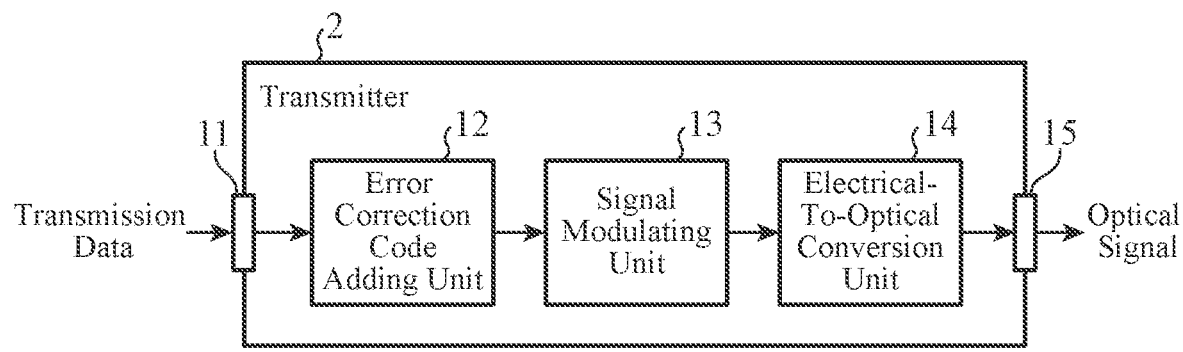
FIG. 2 is a configuration diagram illustrating a transmitter 2 included in the optical communication system 1 according to the first embodiment.

FIG. 2 is a configuration diagram illustrating the transmitter 2 included in the optical communication system 1 according to the first embodiment.

The transmitter 2 illustrated in FIG. 2 includes an input terminal 11, an error correction code adding unit 12, a signal modulating unit 13, an electrical-to-optical conversion unit 14, and an output terminal 15.

The input terminal 11 is implemented by, for example, a connector.

Transmission data is supplied from the outside to the input terminal 11.

The error correction code adding unit 12 is implemented by, for example, an error correction code adding circuit.

The error correction code adding unit 12 adds an error correction code to the transmission data and outputs the transmission data to which the error correction code has been added to the signal modulating unit 13.

The signal modulating unit 13 is implemented by, for example, a signal modulator.

The signal modulating unit 13 modulates the transmission data which has been output from the error correction code adding unit 12 and to which the error correction code has been added. As for a method for modulating the transmission data, binary phase shift keying (BPSK), quadrature phase shift keying (QPSK), or the like is used.

The signal modulating unit 13 outputs a modulation signal which is the modulated transmission data to the electrical-to-optical conversion unit 14.

The electrical-to-optical conversion unit 14 is implemented by, for example, an optical modulator.

The electrical-to-optical conversion unit 14 converts the modulation signal output from the signal modulating unit 13 into an optical signal and outputs the optical signal to the output terminal 15.

The output terminal 15 is implemented by, for example, a collimator lens.

The optical signal output from the electrical-to-optical conversion unit 14 is transmitted to each of the repeaters 3-1 to 3-M via the output terminal 15.

Figure 3:
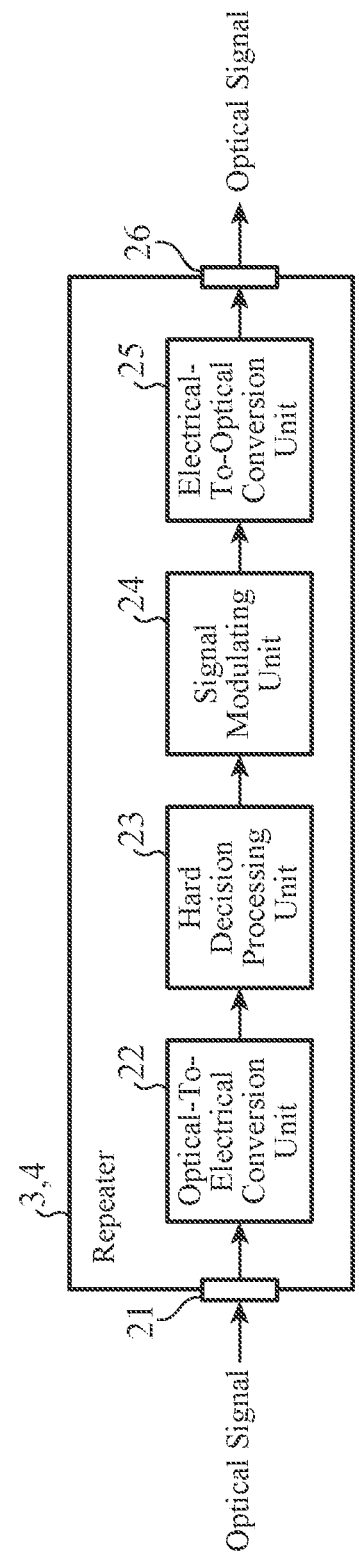
FIG. 3 is a configuration diagram illustrating repeaters 3 and 4 included in the optical communication system 1 according to the first embodiment.

FIG. 3 is a configuration diagram illustrating the repeaters 3 and 4 included in the optical communication system 1 according to the first embodiment.

The repeaters 3 and 4 illustrated in FIG. 3 each include an input terminal 21, an optical-to-electrical conversion unit 22, a hard decision processing unit 23, a signal modulating unit 24, an electrical-to-optical conversion unit 25, and an output terminal 26.

The input terminal 21 is implemented by, for example, a collimator lens.

An optical signal transmitted from the transmitter 2 or an optical signal transferred by the repeater 3 is supplied to the input terminal 21.

The optical-to-electrical conversion unit 22 is implemented by, for example, an integrated coherent receiver (ICR).

The optical-to-electrical conversion unit 22 converts the optical signal into an electrical signal and outputs the electrical signal to the hard decision processing unit 23.

The hard decision processing unit 23 is implemented by, for example, a hard decision processing circuit.

By performing a hard decision process on the electrical signal output from the optical-to-electrical conversion unit 22, the hard decision processing unit 23 decodes transmission data from the electrical signal.

The hard decision processing unit 23 outputs the decoded transmission data to the signal modulating unit 24.

The signal modulating unit 24 is implemented by, for example, a signal modulator.

The signal modulating unit 24 modulates the transmission data output from the hard decision processing unit 23. As for a method for modulating the transmission data, BPSK, QPSK, or the like is used.

The signal modulating unit 24 outputs a modulation signal which is the modulated transmission data to the electrical-to-optical conversion unit 25.

The electrical-to-optical conversion unit 25 is implemented by, for example, an optical modulator.

The electrical-to-optical conversion unit 25 converts the modulation signal output from the signal modulating unit 24 into an optical signal and outputs the optical signal to the output terminal 26.

The output terminal 26 is implemented by, for example, a collimator lens.

The optical signal output from the electrical-to-optical conversion unit 25 is transmitted to the repeater 4-$m$ or the receiver 5 via the output terminal 26.

Figure 4:
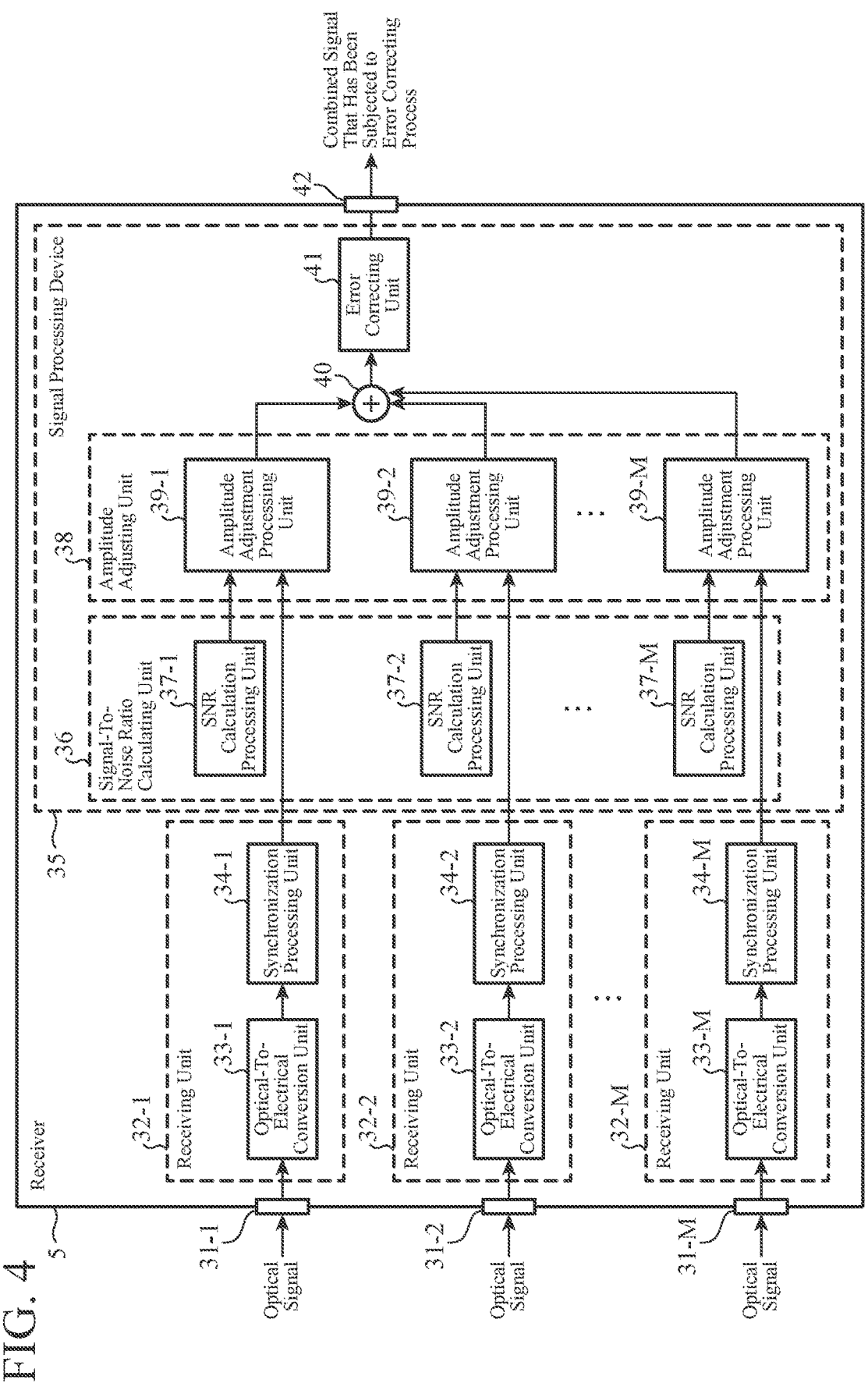
FIG. 4 is a configuration diagram illustrating a receiver 5 included in the optical communication system 1 according to the first embodiment.

FIG. 4 is a configuration diagram illustrating the receiver 5 included in the optical communication system 1 according to the first embodiment.

The receiver 5 illustrated in FIG. 4 includes input terminals 31-1 to 31-M, receiving units 32-1 to 32-M, a signal processing device 35, and an output terminal 42.

The input terminal 31-$m$ ($m$=1, . . . , M) is implemented by, for example, a collimator lens.

An optical signal transferred by the repeater 4-$m$ is supplied to the input terminal 31-$m$.

The receiving unit 32-$m$ includes an optical-to-electrical conversion unit 33-$m$ and a synchronization processing unit 34-$m$.

The receiving unit 32-$m$ receives an optical signal that have been propagated through a path $R_m$ and outputs a reception signal $S_m$ of the optical signal to the signal processing device 35.

The optical-to-electrical conversion unit 33-$m$ is implemented by, for example, an ICR.

The optical-to-electrical conversion unit 33-$m$ converts the optical signal into an electrical signal and outputs the electrical signal to the synchronization processing unit 34-$m$.

The synchronization processing unit 34-$m$ performs a synchronization buffer process on the electrical signal output from the optical-to-electrical conversion unit 33-$m$, in order to synchronize the electrical signals output from the respective optical-to-electrical conversion units 33-1 to 33-M.

The synchronization processing unit 34-$m$ outputs, as a reception signal $S_m$ of the optical signal, the electrical signal that has been subjected to the synchronization buffer process to the signal processing device 35.

Figure 5:
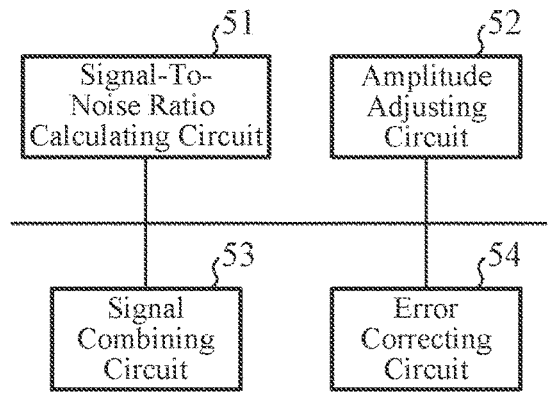
FIG. 5 is a hardware configuration diagram illustrating hardware of a signal processing device 35 according to the first embodiment.

FIG. 5 is a hardware configuration diagram illustrating hardware of the signal processing device 35 according to the first embodiment.

The signal processing device 35 includes a signal-to-noise ratio calculating unit 36, an amplitude adjusting unit 38, a signal combining unit 40, and an error correcting unit 41.

The signal processing device 35 is a device that processes reception signals of optical signals received by the receiver 5 when the optical signals transmitted from the transmitter 2 are propagated to the receiver 5 via M paths.

The signal-to-noise ratio calculating unit 36 includes SNR calculation processing units 37-1 to 37-M.

The signal-to-noise ratio calculating unit 36 is implemented by, for example, a signal-to-noise ratio calculating circuit 51 illustrated in FIG. 5.

The signal-to-noise ratio calculating unit 36 calculates $SNR_1$ to $SNR_M$ which are signal-to-noise ratios of optical signals received by the respective receiving units 32-1 to 32-M, from propagation distances $L_1$ to $L_M$ of the respective optical signals in the paths $R_1$ to $R_M$, an intensity K of each of the optical signals transmitted from the transmitter 2, and an intensity $N_0$ of noise to each of the optical signals.

The signal-to-noise ratio calculating unit 36 outputs $SNR_1$ to $SNR_M$ to the amplitude adjusting unit 38.

The SNR calculation processing unit 37-$m$ calculates $SNR_m$ of an optical signal received by the receiving unit 32-$m$, from a propagation distance $L_m$ of the optical signal in the path $R_m$, the intensity K of the optical signal transmitted from the transmitter 2, and the intensity $N_0$ of noise with respect to the optical signal.

The SNR calculation processing unit 37-$m$ outputs $SNR_m$ to an amplitude adjustment processing unit 39-$m$.

The amplitude adjusting unit 38 includes amplitude adjustment processing units 39-1 to 39-M.

The amplitude adjusting unit 38 is implemented by, for example, an amplitude adjusting circuit 52 illustrated in FIG. 5.

The amplitude adjusting unit 38 adjusts amplitudes $Amp_1$ to $Amp_M$ of reception signals $S_1$ to $S_M$ of optical signals received by the respective receiving units 32-1 to 32-M, using $SNR_1$ to $SNR_M$ calculated by the signal-to-noise ratio calculating unit 36.

The amplitude adjusting unit 38 outputs reception signals $S_1'$ to $S_M'$ whose amplitudes have been adjusted to the signal combining unit 40.

The amplitude adjustment processing unit 39-$m$ adjusts an amplitude $Amp_m$ of a reception signal $S_m$ of an optical signal received by the receiving unit 32-$m$, using $SNR_m$ calculated by the SNR calculation processing unit 37-$m$.

The amplitude adjustment processing unit 39-$m$ outputs a reception signal $S_m'$ whose amplitude has been adjusted to the signal combining unit 40.

The signal combining unit 40 is implemented by, for example, a signal combining circuit 53 illustrated in FIG. 5.

The signal combining unit 40 combines M reception signals $S_1'$ to $S_M'$ whose amplitudes have been adjusted by the amplitude adjusting unit 38.

The signal combining unit 40 outputs a combined signal C of the M reception signals $S_1'$ to $S_M'$ to the error correcting unit 41.

The error correcting unit 41 is implemented by, for example, an error correcting circuit 54 illustrated in FIG. 5.

The error correcting unit 41 performs an error correcting process on the combined signal C output from the signal combining unit 40.

The error correcting unit 41 outputs a combined signal C' that has been subjected to the error correcting process to the output terminal 42.

The output terminal 42 is implemented by, for example, a connector.

The combined signal C' that has been output from the error correcting unit 41 and has subjected to the error correcting process is output to the outside via the output terminal 42.

In FIG. 4, it is assumed that each of the signal-to-noise ratio calculating unit 36, the amplitude adjusting unit 38, the signal combining unit 40, and the error correcting unit 41, which are constituent elements of the signal processing device 35, is implemented by dedicated hardware as illustrated in FIG. 5. That is, it is assumed that the signal processing device 35 is implemented by the signal-to-noise ratio calculating circuit 51, the amplitude adjusting circuit 52, the signal combining circuit 53, and the error correcting circuit 54.

For example, a single circuit, a composite circuit, a programmed processor, a parallel programmed processor, an application specific integrated circuit (ASIC), a field-programmable gate array (FPGA), or a combination thereof corresponds to each of the signal-to-noise ratio calculating circuit 51, the amplitude adjusting circuit 52, the signal combining circuit 53, and the error correcting circuit 54.

The constituent elements of the signal processing device 35 are not limited to those implemented by dedicated hardware, and the signal processing device 35 may be implemented by software, firmware, or a combination of software and firmware.

The software or the firmware is stored as a program in a memory of a computer. The computer means hardware for executing a program. For example, a central processing unit (CPU), a central processing device, a processing device, an arithmetic device, a microprocessor, a microcomputer, a processor, or a digital signal processor (DSP) corresponds to the computer.

Figure 6:
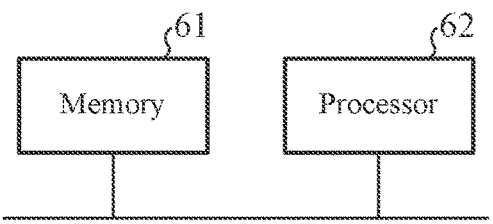

FIG. 6 is a hardware configuration diagram of a computer when the signal processing device 35 is implemented by software, firmware, or the like.

When the signal processing device 35 is implemented by software, firmware, or the like, a program for causing a computer to execute processing procedures performed in each of the signal-to-noise ratio calculating unit 36, the amplitude adjusting unit 38, the signal combining unit 40, and the error correcting unit 41 is stored in a memory 61. A processor 62 of the computer executes the program stored in the memory 61.

FIG. 5 illustrates an example in which each of the constituent elements of the signal processing device 35 is implemented by dedicated hardware, and FIG. 6 illustrates an example in which the signal processing device 35 is implemented by software, firmware, or the like. However, these are only examples, and some constituent elements in the signal processing device 35 may be implemented by dedicated hardware, and the remaining constituent elements may be implemented by software, firmware, or the like.

For example, observation data of a ground probe for an extra-terrestrial celestial body is transmitted to the earth via a multi-purpose probe in an orbit around the extra-terrestrial celestial body. When the observation data is transmitted by radio wave communication, a communication speed is limited, and the communication speed is about several hundred kilobits per second (BPS). Optical communication can perform high-speed communication as compared with radio wave communication, and therefore may be used for transmission of observation data of a ground probe.

For example, in optical communication between the earth and an extra-terrestrial celestial body, long-term communication interruption may occur due to an influence of sunlight. Therefore, in a period in which direct communication cannot be performed between the earth and the extra-terrestrial celestial body, it is necessary to perform optical communication via a repeater. That is, the transmitter 2 needs to transmit optical signals to the receiver 5 via the plurality of paths $R_1$ to $R_M$ in which the repeaters 3 and 4 are arranged.

However, in a case where channel qualities of the plurality of paths $R_1$ to $R_M$ are different from each other, when reception signals of the optical signals that have been propagated through the plurality of respective paths $R_1$ to $R_M$ are simply combined, the number of bit errors included in a combined signal may increase.

In the optical communication system 1 illustrated in FIG. 1, in order to suppress an increase in the number of bit errors included in the combined signal, the reception signals of the optical signals that have been propagated through the plurality of respective paths $R_1$ to $R_M$ are combined on the basis of $SNR_1$ to $SNR_M$ of the optical signals that have been propagated through the plurality of respective paths $R_1$ to $R_M$.

Next, the operation of the optical communication system 1 illustrated in FIG. 1 will be described.

The transmitter 2 transmits an optical signal to each of the repeaters 3-1 to 3-M.

Hereinafter, the operation of transmitting an optical signal by the transmitter 2 will be specifically described.

Transmission data is supplied from the outside to the input terminal 11 of the transmitter 2.

The error correction code adding unit 12 adds an error correction code to the transmission data and outputs the transmission data to which the error correction code has been added to the signal modulating unit 13. Since a process itself of adding the error correction code to the transmission data is a known technique, detailed description thereof is omitted.

Upon receiving the transmission data to which the error correction code has been added from the error correction code adding unit 12, the signal modulating unit 13 modulates the transmission data to which the error correction code has been added by, for example, a modulation method of BPSK or QPSK.

The signal modulating unit 13 outputs a modulation signal which is the modulated transmission data to the electrical-to-optical conversion unit 14.

Upon receiving the modulation signal from the signal modulating unit 13, the electrical-to-optical conversion unit 14 converts the modulation signal into an optical signal and outputs the optical signal to the output terminal 15.

The optical signal output from the electrical-to-optical conversion unit 14 is transmitted to each of the repeaters 3-1 to 3-M via the output terminal 15.

The repeater 3-$m$ ($m$=1, . . . , M) transfers the optical signal transmitted from the transmitter 2 to the repeater 4-$m$.

The repeater 4-$m$ transfers the optical signal transferred by the repeater 3-$m$ to the receiver 5.

Hereinafter, the operations of transferring an optical signal by the repeaters 3-$m$ and 4-$m$ will be specifically described.

Note that, since the operation of transferring an optical signal by the repeater 3-$m$ is the same as the operation of transferring an optical signal by the repeater 4-$m$, the operation of transferring an optical signal by the repeater 3-$m$ will be specifically described here.

An optical signal transmitted from the transmitter 2 is supplied to the input terminal 21 of the repeater 3-$m$. Optical signals supplied to the input terminals 21 of the repeaters 3-1 to 3-M are the same optical signals.

The optical-to-electrical conversion unit 22 converts the optical signal into an electrical signal and outputs the electrical signal to the hard decision processing unit 23.

Upon receiving the electrical signal from the optical-to-electrical conversion unit 22, the hard decision processing unit 23 decodes transmission data from the electrical signal by performing a hard decision process on the electrical signal.

When a modulation method by the signal modulating unit 13 of the transmitter 2 is, for example, BPSK, an optical signal having a signal level of "0" or an optical signal having a signal level of "1" is supplied to the input terminal 21 of the repeater 3-$m$.

However, noise is superimposed on the optical signal between transmission of the optical signal from the transmitter 2 and supply of the optical signal to the input terminal 21 of the repeater 3-$m$. Since noise is superimposed on the optical signal, an optical signal whose signal level is deviated from "0" or "1" is supplied to the input terminal 21 of the repeater 3-$m$. For example, an optical signal having a signal level of "0" may be supplied to the input terminal 21 as an optical signal having a signal level of "0.1", and an optical signal having a signal level of "1" may be supplied to the input terminal 21 as an optical signal having a signal level of "0.8".

In an internal memory of the hard decision processing unit 23, for example, a threshold Th of "0.5" which is an intermediate value between "0" and "1" is stored.

The hard decision processing unit 23 compares each of signal levels of a plurality of pieces of transmission data included in the electrical signal output from the optical-to-electrical conversion unit 22 with the threshold Th.

The hard decision processing unit 23 restores a signal point of "0" when the signal level of the transmission data is less than the threshold Th, and restores a signal point of "1" when the signal level of the transmission data is equal to or larger than the threshold Th.

The hard decision processing unit 23 outputs the restored signal point to the signal modulating unit 24 as decoded transmission data.

Upon receiving the decoded transmission data from the hard decision processing unit 23, the signal modulating unit 24 modulates the decoded transmission data by, for example, a modulation method of BPSK or QPSK.

The signal modulating unit 24 outputs a modulation signal which is the modulated transmission data to the electrical-to-optical conversion unit 25.

Upon receiving the modulation signal from the signal modulating unit 24, the electrical-to-optical conversion unit 25 converts the modulation signal into an optical signal and outputs the optical signal to the output terminal 26.

The optical signal output from the electrical-to-optical conversion unit 25 is transmitted to the repeater 4-$m$ via the output terminal 26.

As a result, an optical signal that has been propagated through the path $R_1$ in which the repeaters 3-1 and 4-1 are arranged is supplied to the input terminal 31-1 of the receiver 5, and an optical signal that has been propagated through the path $R_2$ in which the repeaters 3-2 and 4-2 are arranged is supplied to the input terminal 31-2 of the receiver 5. In addition, an optical signal that has been propagated through the path $R_M$ in which the repeaters 3-M and 4-M are arranged is supplied to the input terminal 31-M of the receiver 5.

The receiving unit 32-$m$ ($m=1, \ldots, M$) of the receiver 5 receives an optical signal that has been propagated through the path $R_m$ and outputs a reception signal $S_m$ of the optical signal to the signal processing device 35.

That is, the optical-to-electrical conversion unit 33-$m$ converts the optical signal supplied to the input terminal 31-$m$ into an electrical signal and outputs the electrical signal to the synchronization processing unit 34-$m$.

The synchronization processing unit 34-$m$ performs a synchronization buffer process on the electrical signal output from the optical-to-electrical conversion unit 33-$m$, in order to synchronize the electrical signals output from the respective optical-to-electrical conversion units 33-1 to 33-M.

The synchronization processing unit 34-$m$ outputs, as the reception signal $S_m$, the electrical signal that has been subjected to the synchronization buffer process to the signal processing device 35.

As for the synchronization buffer process on the electrical signal, for example, the following process can be considered.

A propagation time $T_m$, which is a time required for an optical signal to reach the receiving unit 32-$m$ ($m=1, \ldots, M$) of the receiver 5 after being transmitted from the transmitter 2, is proportional to a propagation distance $L_m$ of the path $R_m$. That is, the shorter the propagation distance $L_m$ of the path $R_m$, the shorter the propagation time $T_m$.

The synchronization processing unit 34-$m$ calculates the propagation distance $L_m$ of the path $R_m$ before performing the synchronization buffer process, and calculates the propagation time $T_m$ of the optical signal in the path $R_m$ from the propagation distance $L_m$ of the path $R_m$.

The calculation of the propagation distance $L_m$ of the path $R_m$ is similar to calculation of the propagation distance $L_m$ in the SNR calculation processing unit 37-$m$, and will be described later. The synchronization processing unit 34-$m$ may acquire the propagation distance $L_m$ of the path $R_m$ from the SNR calculation processing unit 37-$m$, without calculating the propagation distance $L_m$ of the path $R_m$.

Since the process itself of calculating the propagation time $T_m$ of an optical signal from the propagation distance $L_m$ is a known technique, detailed description thereof is omitted.

In addition, before performing the synchronization buffer process, the synchronization processing unit 34-$m$ specifies a maximum propagation time $T_{max}$ among the propagation times $T_1$ to $T_M$ and calculates a time difference $\Delta T_m$ between the maximum propagation time $T_{max}$ and the propagation time $T_m$. Among the synchronization processing units 34-1 to 34-M, the synchronization processing unit 34-$m$ related to the propagation time $T_{max}$ being the maximum propagation time $T_m$ calculates the time difference $\Delta T_m$ to be 0.

Upon receiving an electrical signal from the optical-to-electrical conversion unit 33-$m$, the synchronization processing unit 34-$m$ performs, as a synchronization buffer process on the electrical signal, a process of holding the electrical signal only during the time difference $\Delta T_m$, and then outputting the electrical signal to the amplitude adjustment processing unit 39-$m$.

The signal processing device 35 processes reception signals of optical signals received by the receiver 5 when the optical signals transmitted from the transmitter 2 are propagated to the receiver 5 via M paths.

Figure 7:
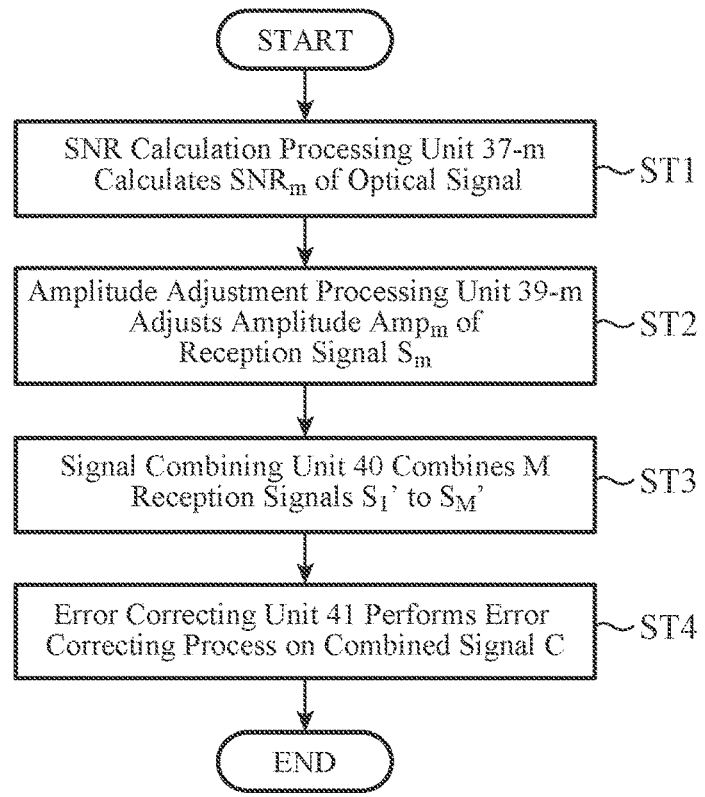
FIG. 7 is a flowchart illustrating a signal processing method which is a processing procedure performed by the signal processing device 35 according to the first embodiment.

FIG. 7 is a flowchart illustrating a signal processing method which is a processing procedure performed by the signal processing device 35 according to the first embodiment.

Hereinafter, processing contents of the signal processing device 35 will be specifically described.

In an internal memory of the SNR calculation processing unit 37-$m$ of the signal-to-noise ratio calculating unit 36, an intensity K of an optical signal transmitted from the transmitter 2 and an intensity $N_0$ of noise with respect to the optical signal are stored.

In the optical communication system 1 illustrated in FIG. 1, the intensity K of the optical signal transmitted from the transmitter 2 is constant, and in the signal processing device 35, the intensity K of the optical signal is a default value. However, this is merely an example, and for example, when the intensity K of the optical signal changes with a lapse of time, the intensity K of the optical signal at each time may be stored in the internal memory of the SNR calculation processing unit 37-$m$.

It is known that the intensity $N_0$ of noise with respect to an optical signal can be approximated to a constant value in outer space, and the constant value is stored in the internal memory of the SNR calculation processing unit 37-$m$ as the intensity $N_0$ of noise.

For example, when the optical communication system 1 illustrated in FIG. 1 transmits and receives an optical signal on the earth, the intensity $N_0$ of noise cannot be approximated to a constant value. In this case, for example, a computer (not illustrated) may calculate the intensity $N_0$ of noise with respect to an optical signal propagated through the path $R_m$ by performing computer simulation, and the calculation result of the intensity $N_0$ may be stored in the internal memory of the SNR calculation processing unit 37-$m$.

In the optical communication system 1 illustrated in FIG. 1, the intensity K of an optical signal and the intensity $N_0$ of noise are stored in the internal memory of the SNR calculation processing unit 37-$m$. However, this is merely an example, and the intensity K of an optical signal and the intensity $N_0$ of noise may be supplied from the outside of the receiver 5.

In the internal memory of the SNR calculation processing unit 37-$m$ of the signal-to-noise ratio calculating unit 36, information indicating a three-dimensional position of each of the transmitter 2, the repeaters 3 and 4, and the receiver 5 is stored. When each three-dimensional position changes with a lapse of time, information indicating the corresponding three-dimensional position at each time is stored in the internal memory of the SNR calculation processing unit 37-$m$.

When the optical communication system 1 illustrated in FIG. 1 is used in outer space, for example, a coordinate system of the three-dimensional position is a coordinate system of outer space.

In the optical communication system 1 illustrated in FIG. 1, the information indicating each three-dimensional position is stored in the internal memory of the SNR calculation processing unit 37-$m$. However, this is merely an example, and the information indicating each three-dimensional position may be supplied from the outside of the receiver 5.

The SNR calculation processing unit 37-$m$ calculates the propagation distance $L_m$ of the path $R_m$ using the information indicating each three-dimensional position.

That is, the SNR calculation processing unit 37-$m$ calculates a distance $L_{m,1}$ between the transmitter 2 and the repeater 3-$m$, a distance $L_{m,2}$ between the repeater 3-$m$ and the repeater 4-$m$, and a distance $L_{m,3}$ between the repeater 4-$m$ and the receiver 5 using the information indicating each three-dimensional position. Since the process itself of calculating the distance $L_{m,1}$, the distance $L_{m,2}$, and the distance $L_{m,3}$ using the information indicating each three-dimensional position is a known technique, detailed description thereof is omitted.

The SNR calculation processing unit 37-$m$ calculates the propagation distance $L_m$ of the path $R_m$ from the distance $L_{m,1}$, the distance $L_{m,2}$, and the distance $L_{m,3}$ as indicated in the following formula (1).

$$L_m = L_{m,1} + L_{m,2} + L_{m,3} \quad (1)$$

As indicated in the following formula (2), the SNR calculation processing unit 37-$m$ calculates $SNR_m$ of an optical signal received by the receiving unit 32-$m$, from the intensity K of an optical signal transmitted from the transmitter 2, the intensity $N_0$ of noise with respect to the optical signal, and the propagation distance $L_m$ of the optical signal in the path $R_m$ (step ST1 in FIG. 7).

$$SNR_m = \frac{K}{N_0 L_m^2} \quad (2)$$

The SNR calculation processing unit 37-$m$ outputs $SNR_m$ of the optical signal to the amplitude adjustment processing unit 39-$m$.

Upon receiving the reception signal $S_m$ from the synchronization processing unit 34-$m$, as indicated in the following formula (3), the amplitude adjustment processing unit 39-$m$ adjusts an amplitude $Amp_m$ of the reception signal $S_m$ using $SNR_m$ output from the SNR calculation processing unit 37-$m$ (step ST2 in FIG. 7).

$$Amp_m' = g_m \times Amp_m \quad (3)$$

In formula (3), $Amp_m'$ is an amplitude after adjustment, and $g_m$ is a coefficient directly proportional to $SNR_m$.

The amplitude adjustment processing unit 39-$m$ outputs a reception signal $S_m'$ whose amplitude has been adjusted to the signal combining unit 40.

The signal combining unit 40 acquires M reception signals $S_1'$ to $S_M'$ whose amplitudes have been adjusted from the amplitude adjustment processing units 39-1 to 39-M.

The signal combining unit 40 combines M reception signals $S_1'$ to $S_M'$ as indicated in the following formula (4) (step ST3 in FIG. 7).

$$C = S_1' + S_2' + \ldots + S_M' \quad (4)$$

The signal combining unit 40 outputs a combined signal C of the M reception signals $S_1'$ to $S_M'$ to the error correcting unit 41.

The signal combining unit 40 combines M reception signals $S_1'$ to $S_M'$ each of whose amplitude has been adjusted in accordance with the corresponding SNR of the corresponding optical signal. The larger SNR a reception signal of an optical signal has, the larger weight the reception signal is combined with, and the smaller SNR a reception signal of an optical signal has, the smaller weight the reception signal is combined with. Therefore, since an influence of a reception signal of an optical signal having a small SNR is reduced, an increase in the number of error bits included in the combined signal C is suppressed as compared with a case where the M reception signals $S_1$ to $S_M$ are combined without amplitude adjustment.

Upon receiving the combined signal C from the signal combining unit 40, the error correcting unit 41 performs an error correcting process on the combined signal C (step ST4 in FIG. 7). Since the error correcting process itself on the combined signal C is a known technique, detailed description thereof is omitted.

The error correcting unit 41 outputs a combined signal C' that has been subjected to the error correcting process to the output terminal 42.

The combined signal C' that is output from the error correcting unit 41 and has subjected to the error correcting process is output to the outside via the output terminal 42.

In the above first embodiment, the signal processing device 35 is configured in such a way that the signal processing device 35 processes reception signals of optical signals received by the receiver 5 when the optical signals transmitted from the transmitter 2 are propagated to the receiver 5 via a plurality of paths, and includes: the signal-to-noise ratio calculating unit 36 that calculates signal-to-noise ratios of the optical signals that have been propagated through the respective paths, from propagation distances of the optical signals in the respective paths, intensities of the optical signals transmitted from the transmitter 2, and intensities of noise with respect to the optical signals transmitted from the transmitter 2; the amplitude adjusting unit 38 that adjusts amplitudes of the reception signals of the optical signals that have been propagated through the respective paths, using the corresponding signal-to-noise ratios calculated by the signal-to-noise ratio calculating unit 36; and the signal combining unit 40 that combines the reception signals whose amplitudes have been adjusted by the amplitude adjusting unit 38. Therefore, the signal processing device 35 can suppress an increase in the number of bit errors included in a combined signal of a plurality of reception signals without including a pilot signal in an optical signal.

Second Embodiment

In a second embodiment, an optical communication system 1 will be described in which a transmitter 2 is disposed on a second satellite 74 orbiting a first satellite 72 orbiting a star 71, a receiver 5 is disposed on a fourth satellite 78 orbiting a third satellite 76 orbiting the star 71, and a plurality of repeaters 3 and 4 is disposed at Lagrange points between the star 71 and the first satellite 72.

Figure 8:
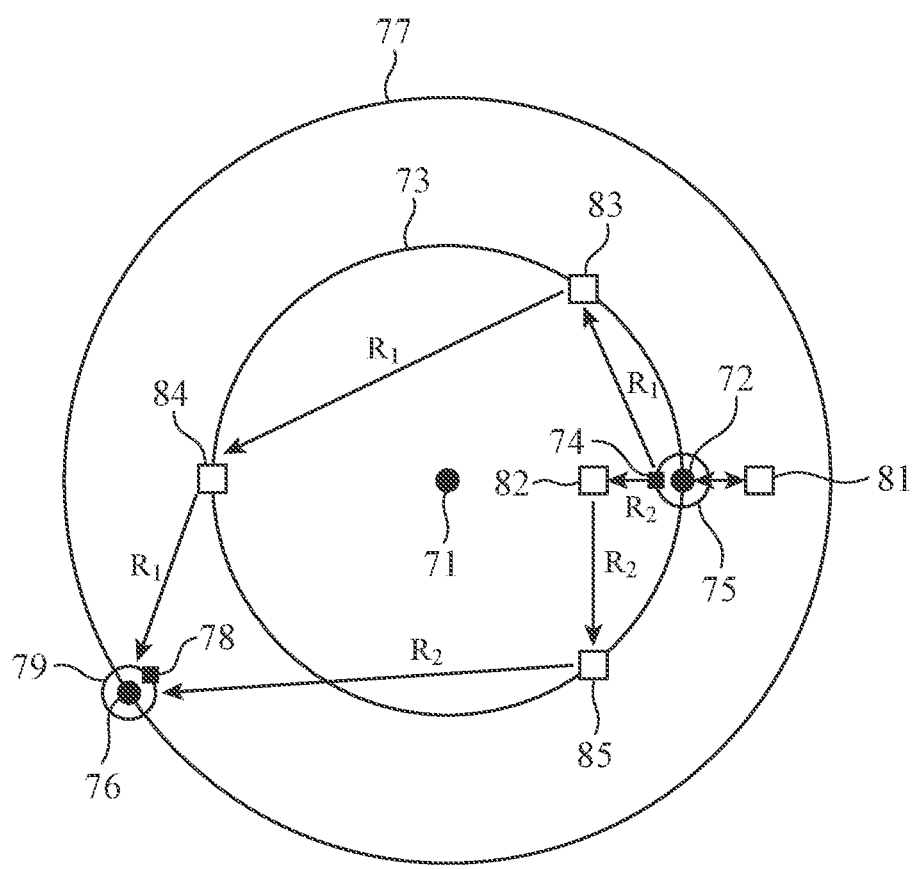
FIG. 8 is an explanatory diagram illustrating an arrangement example of a transmitter 2, repeaters 3 and 4, and a receiver 5 included in an optical communication system 1 according to a second embodiment.

FIG. 8 is an explanatory diagram illustrating an arrangement example of the transmitter 2, the repeaters 3 and 4, and the receiver 5 included in the optical communication system 1 according to the second embodiment.

In the arrangement example illustrated in FIG. 8, when the optical communication system 1 is used in outer space, $SNR_m$ of an optical signal propagated through a path $R_m$ increases.

In FIG. 8, the reference numeral 71 represents a star.
The first satellite 72 is a satellite orbiting the star 71 around the star 71.
The satellite orbit 73 is a satellite orbit of the first satellite 72.
The second satellite 74 is a satellite orbiting the first satellite 72 around the first satellite 72.
The satellite orbit 75 is a satellite orbit of the second satellite 74.
The transmitter 2 is disposed on the second satellite 74.
The third satellite 76 is a satellite orbiting the star 71 around the star 71.
The satellite orbit 77 is a satellite orbit of the third satellite 76.
The fourth satellite 78 is a satellite orbiting the third satellite 76 around the third satellite 76.
The satellite orbit 79 is a satellite orbit of the fourth satellite 78.
The receiver 5 is disposed on the fourth satellite 78.
Lagrange points 81 to 85 are Lagrange points between the star 71 and the first satellite 72.
The repeater 3-1 is disposed at the Lagrange point 83.
The repeater 4-1 is disposed at the Lagrange point 84.
The repeater 3-2 is disposed at the Lagrange point 82.
The repeater 4-2 is disposed at the Lagrange point 85.
A path from the transmitter 2 to the receiver 5 via the repeater 3-1 and the repeater 4-1 is $R_1$.
A path from the transmitter 2 to the receiver 5 via the repeater 3-2 and the repeater 4-2 is $R_2$.

In the arrangement example illustrated in FIG. 8, the two paths $R_1$ and $R_2$ are formed. However, this is merely an example, and three or more paths may be formed. In addition to the two paths $R_1$ and $R_2$, for example, a path $R_3$ from the transmitter 2 to the receiver 5 via the repeater 3-1 or a path $R_4$ from the transmitter 2 directly to the receiver 5 may be formed.

In the arrangement example illustrated in FIG. 8, the transmitter 2 is disposed on the second satellite 74, and the receiver 5 is disposed on the fourth satellite 78. However, this is merely an example, and for example, the transmitter 2 may be disposed on the fourth satellite 78, and the receiver 5 may be disposed on the second satellite 74.

The repeaters 3 and 4 arranged at the Lagrange points are less affected by disturbance light from the star 71 than repeaters arranged at points other than the Lagrange points. Therefore, the repeater 3-1 disposed at the Lagrange point 83, the repeater 3-2 disposed at the Lagrange point 82, the repeater 4-1 disposed at the Lagrange point 84, and the repeater 4-2 disposed at the Lagrange point 85 can transfer optical signals without being much affected by disturbance light from the star 71.

In the above second embodiment, the optical communication system 1 is configured in such a way that the transmitter 2 is disposed on the second satellite 74 orbiting the first satellite 72 orbiting the star 71, the receiver 5 is disposed on the fourth satellite 78 orbiting the third satellite 76 orbiting the star 71, and the plurality of repeaters 3 and 4 is disposed at Lagrange points between the star 71 and the first satellite 72. Therefore, the optical communication system 1 can suppress an increase in the number of bit errors due to an influence of disturbance light from the star 71.

Note that the present disclosure can freely combine the embodiments to each other, modify any constituent element in each of the embodiments, or omit any constituent element in each of the embodiments.

INDUSTRIAL APPLICABILITY

The present disclosure is suitable for a signal processing device, a signal processing method, and a receiver that combine a plurality of reception signals.

The present disclosure is suitable for an optical communication system including the receiver.

REFERENCE SIGNS LIST

1: Optical communication system, 2: Transmitter, 3-1 to 3-M: Repeater, 4-1 to 4-M: Repeater, 5: Receiver, 11: Input terminal, 12: Error correction code adding unit, 13: Signal modulating unit, 14: Electrical-to-optical conversion unit, 15: Output terminal, 21: Input terminal, 22: Optical-to-electrical conversion unit, 23: Hard decision processing unit, 24: Signal modulating unit, 25: Electrical-to-optical conversion unit, 26: Output terminal, 31-1 to 31-M: Input terminal, 32-1 to 32-M: Receiving unit, 33-1 to 33-M: Optical-to-electrical conversion unit, 34-1 to 34-M: Synchronization processing unit, 35: Signal processing device, 36: Signal-to-noise ratio calculating unit, 37-1 to 37-M: SNR calculation processing unit, 38: Amplitude adjusting unit, 39-1 to 39-M: Amplitude adjustment processing unit, 40: Signal combining unit, 41: Error correcting unit, 51: Signal-to-noise ratio calculating circuit, 52: Amplitude adjusting circuit, 53: Signal combining circuit, 54: Error correcting circuit, 61: Memory, 62: Processor, 71: Star, 72: First satellite, 73: Satellite orbit, 74: Second satellite, 75: Satellite orbit, 76: Third satellite, 77: Satellite orbit, 78: Fourth satellite, 81 to 85: Lagrange point

The invention claimed is:

1. A signal processing device to process reception signals of optical signals received by a receiver when the optical signals transmitted from a transmitter are propagated to the receiver via a plurality of paths, the signal processing device comprising:

signal-to-noise ratio calculating circuitry to calculate signal-to-noise ratios of the optical signals that have been propagated through the respective paths, the signal-to-noise ratios being based on propagation distances of the optical signals in the respective paths, intensities of the optical signals transmitted from the transmitter, and intensities of noise with respect, to the optical signals transmitted from the transmitter;

amplitude adjusting circuitry to adjust amplitudes of the reception signals of the optical signals that have been propagated through the respective paths, using the corresponding signal-to-noise ratios calculated by the signal-to-noise ratio calculating circuitry; and signal combining circuitry to combine the reception signals whose amplitudes have been adjusted by the amplitude adjusting circuitry.

2. A signal processing method for processing reception signals of optical signals received by a receiver when the optical signals transmitted from a transmitter are propagated to the receiver via a plurality of paths, the signal processing method comprising:

calculating signal-to-noise ratios of the optical signals that have been propagated through the respective paths, the signal-to-noise ratios being based on propagation distances of the optical signals in the respective paths, intensities of the optical signals transmitted from the transmitter, and intensities of noise with respect to the optical signals transmitted from the transmitter;

adjusting amplitudes of the reception signals of the optical signals that have been propagated through the respective paths, using the corresponding signal-to-noise ratios calculated; and combining the reception signals whose amplitudes have been adjusted.

3. A receiver comprising:

a plurality of receivers to receive optical signals that have been propagated through a plurality of respective paths through which the optical signals transmitted from a transmitter are propagated, and to output reception signals of the respective optical signals;

signal-to-noise ratio calculating circuitry to calculate signal-to-noise ratios of the optical signals received by the respective receivers, the signal-to-noise ratios being based on propagation distances of the optical signals in the respective paths, intensities of the optical signals transmitted from the transmitter, and intensities of noise with respect to the optical signals transmitted from the transmitter;

amplitude adjusting circuitry to adjust amplitudes of the reception signals output from the respective receivers, using the corresponding signal-to-noise ratios calculated by the signal-to-noise ratio calculating circuitry; and signal combining circuitry to combine the reception signals whose amplitudes have been adjusted by the amplitude adjusting circuitry.

4. The receiver according to claim 3, wherein repeaters to transfer the optical signals transmitted from the transmitter are arranged on the respective paths, and the respective receivers receive the optical signals transferred by the repeaters arranged on the respective paths.

5. An optical communication system comprising a transmitter to transmit optical signals to a plurality of paths;

a plurality of repeaters to transfer the optical signals that have been propagated through the respective paths, the plurality of repeaters being disposed on the respective paths; and a receiver to receive the optical signals transferred by the respective repeaters, wherein the receiver is the receiver according to claim 3.

6. The optical communication system according to claim 5, wherein each of the repeaters converts an optical signal that have been propagated through each of the paths into an electrical signal, decodes transmission data from the electrical signal, modulates the decoded transmission data, converts a modulation signal which is the modulated transmission data into an optical signal, and transfers the optical signal.

7. The optical communication system according to claim 5, wherein the transmitter is disposed on a second satellite orbiting a first satellite orbiting a star, the receiver is disposed on a fourth satellite orbiting a third satellite orbiting the star, and each of the repeaters is disposed at a Lagrange point between the star and the first satellite.

* * * * *